(12) United States Patent
Fu (10) Patent No.: US 7,212,190 B2
(45) Date of Patent: May 1, 2007

(54) SENSOR CONTROLS FOR POINTING AND CONTROL DEVICE AND SUCH DEVICE

(76) Inventor: Liang Fu, 12046 Gatewater Dr., Potomac, MD (US) 20854

( * ) Notice: Subject to any disclaimer, the term of this patent is extended or adjusted under 35 U.S.C. 154(b) by 525 days.

(21) Appl. No.: 10/636,746

(22) Filed: Aug. 8, 2003

(65) Prior Publication Data
US 2005/0030285 A1 Feb. 10, 2005

(51) Int. Cl.
*G09G 5/00* (2006.01)
(52) U.S. Cl. ........................ 345/163; 345/156
(58) Field of Classification Search ............. 248/118, 248/118.1, 118.5; 341/20; 345/156–173; D14/402–410; 463/38
See application file for complete search history.

(56) References Cited

U.S. PATENT DOCUMENTS

| | | | |
|---|---|---|---|
| 5,095,302 A | 3/1992 | McLean | |
| 5,555,894 A | 9/1996 | Doyama | |
| 5,767,457 A | 6/1998 | Gerphede | |
| 5,805,144 A | 9/1998 | Scholder | |
| 5,841,425 A | 11/1998 | Zenz, Sr. | |
| 5,982,356 A * | 11/1999 | Akiyama | 345/161 |
| 6,118,431 A | 9/2000 | Terrier | |
| 6,288,707 B1 | 9/2001 | Philipp | |
| 6,396,477 B1 | 5/2002 | Hinckley | |
| 6,456,275 B1 | 9/2002 | Hinckley | |
| 6,496,180 B1 | 12/2002 | Hedman | |
| 6,853,365 B2 * | 2/2005 | Reid et al. | 345/163 |
| 2001/0043149 A1* | 11/2001 | Chan | 341/20 |
| 2003/0048250 A1* | 3/2003 | Boon et al. | 345/156 |
| 2005/0062729 A1* | 3/2005 | Hinckley et al. | 345/173 |
| 2005/0275625 A1* | 12/2005 | Koenig | 345/156 |

OTHER PUBLICATIONS

U.S. Appl. No. 10/025,838, filed Aug. 15, 2002, Kehlstadt.
U.S. Appl. No. 10/079,033, filed Jul. 18, 2002, Lignoul.
U.S. Appl. No. 10/124,892, filed Sep. 12, 2002, Junod.
U.S. Appl. No. 09/273,455, filed Apr. 18, 2002, Nakamura.
U.S. Appl. No. 09/774,843, filed Sep. 27, 2001, Lewis.

* cited by examiner

Primary Examiner—Nitin Patel (57) ABSTRACT

A first aspect of the present invention includes various sensor controls for pointing and control devices. The sensor controls are much easier and require much less physical effort to operate than conventional controls. The sensor controls have built-in feedback-generating means that produce feedback to the user, similar to conventional controls such as micro switches. The built-in feedback-generating means have simpler structure, they are either commercially available or built with a few commonly available simple components, hence, they should be reliable, and inexpensive to produce. The sensor controls of the present invention with built-in feedback-generating means can be used directly in place of the corresponding conventional controls of pointing and control devices, with no or little impact on any other component. A second aspect of the present invention is a pointing and control device incorporating such sensor controls. The pointing and control device of the present invention allows a user to rest his or her hand and fingers on the housing of the device in a most relaxed and natural posture, and the sensor controls can be operated either by curling a finger (on-and-off controls) or by sliding a finger (motion controls). The present invention greatly improves the posture of the user's hand and significantly reduces the corresponding stress that is typical of the prior-art pointing and control devices.

20 Claims, 4 Drawing Sheets

SENSOR CONTROLS FOR POINTING AND CONTROL DEVICE AND SUCH DEVICE

CROSS-REFERENCE TO RELATED APPLICATIONS

Not Applicable

FEDERALY SPONSORED RESEARCH

Not Applicable

SEQUENCE LISTING OR PROGRAM

Not Applicable

BACKGROUND OF THE INVENTION—FIELD OF INVENTION

This invention relates to pointing and control devices, especially pointing and control devices with sensor controls.

BACKGROUND OF THE INVENTION—PRIOR ART

Pointing and control devices have already become indispensable interface devices for computers and are being equipped more and more with other equipments. The most popular pointing and control device is the computer mouse. A basic computer mouse comprises (1) a motion control that is responsible for generating two-dimensional (2-D, x and y) motion control signals indicative of direction and magnitude to control a cursor on a display, (2) two switch controls that are responsible for generating binary (on and off) switch-control signals to issue simple commands (such as selecting an item, start a program, etc.), and (3) an electronic circuitry, including a microprocessor, that processes these signals and formats them into suitable forms, and communicates them with the computer through a communication link (cable or wireless). The computer is capable of recognizing and acting upon these signals.

Other common types of pointing and control devices include trackballs, touch pads, and joysticks (or the like). More complex or specialty pointing and control devices comprise more than one motion controls and more switch controls to generate multi-dimensional (higher than 2-D) and multi-functional signals. For example, many computer mice are equipped with a roller-wheel control. A roller-wheel control is essentially a 1-D motion control since it generates 1-D motion signals. The roller-wheel control is usually used for image scrolling.

To use a pointing and control device, a user places one hand on top of the pointing and control device, either slides it on a horizontal surface (a mouse type pointing and control device) or uses fingers (track ball, touch pad, joystick, etc.) to control the motion control. From time to time, a user also uses fingers to operate the switch controls (click and double click) and roller-wheel controls if needed.

At present, the most popular switch controls are mechanical switch controls. A mechanical switch control consists of a depressible button cap (hinged on the housing of pointing and control device) and a two-state (on and off) micro switch underneath the button cap. When a user depresses a button cap, the corresponding micro switch switches to the on state, and when the user releases the button cap it switches to the off state. The micro switch generates on signal (usually a constant voltage) and off signal (a zero voltage or null signal), respectively, in on state and off state. Trackball and joystick-like pointing and control devices are also equipped with mechanical switch controls.

Some touch pads are capable of sensing a tap by the user's fingertip as a qualified tap: if its characteristics, such as force and duration, satisfy certain criteria. A qualified tap is treated as equivalent to a left-button click. Some touch pads have several designated areas, each functioning like a switch control (virtual switch). However, since it is difficult to use the tapping mechanism to produce a continuous on signal, as required in some situations, such as dragging an object or blocking a portion of text, touch pads are often equipped with ordinary mechanical switch controls as well.

As computer window programs and graphical user interfaces (GUI) become increasingly popular, the use of pointing and control devices becomes more and more extensive and intensive. Intensive use of pointing and control devices carries a significant risk of repetitive stress injury (RSI) and copal tunnel syndrome (CTS) to the user. Repetitive operation of switch controls is believed to be a major cause of RSI.

Although the force required to activate a mechanical switch control is typically small on a normal scale, human hands were not designed by nature to perform such repetitive movements over a prolonged period of time. Repetitive clicking and especially double-clicking may produce a significant stress to the user's hand and related muscle groups. Accumulated effects may result in a permanent injury. For that very reason, most prior-art pointing and control devices only have switch controls for the index and middle fingers, and some by the thumb, precisely because the ring finger and the little finger are even weaker. This further limits the number of different commands that pointing and control devices can issue. In order to issue additional commands, prior-art designs have to resort to double clicks and combination clicks (depressing two or more switch controls simultaneously). These types of operations generally require even more concentration and effort on the part of the users and result in even more stress to their hands.

The activation threshold of a mechanical switch control is determined by the spring within the micro switch, as well as the structure of the plastic button cap (hinge). That can be reduced to some extend, but it can hardly be eliminated altogether. Sensors, such as electric, magnetic, and optical sensors, often have an electrically adjustable activation threshold that can possibly be reduced to zero, or close to that, which would seem to provide a solution to the problem. However, as it will become apparent from the following discussion, those sensors can hardly be used to totally dispense of mechanical switch controls, unless several associated problems are solved.

Sensors have been used and proposed in conjunction with pointing and control devices for various purposes. The most popular application of sensors in conjunction with pointing and control devices deals with motion control. For example, optical sensors have been used in optical-mechanical and optical-motion controls, trackball motion controls, and roller-wheel controls; capacitive and pressure sensitive sensors have been used in touch pads and joysticks.

U.S. Pat. No. 6,496,180 to Hedman (2002) uses a photodetector array and a slidable LED to generate scrolling control signals. U.S. Pat. No. 5,095,302 to McLean et al. (1992) uses an LED/photodetector array to generate a third dimension (z-direction) motion signal (with the user's finger). U.S. Pat. No. 6,118,431 to Terrier et al. (2000) uses pressure sensors on a mouse cover to generate a third-dimension movement signal (with a squeeze action). U.S.

patent application Ser. No. 10/025,838 of Kehlstadt et al. (2002) and U.S. patent application Ser. No. 09/971,181 of Shaw et al. (2002) use capacitive sensors and a sensor array, respectively, on the top surface of a pointing and control device to generate scrolling signals (with the user's finger). U.S. patent application Ser. No. 09/964,975 of Kehlstadt (2002), U.S. patent application Ser. No. 10/079,033 of Lignoul (2002), U.S. patent application Ser. No. 10/124,892 of Junod et al. (2002) use capacitive sensors to detect the presence of the user's hand. U.S. Pat. No. 5,841,425 to Zenz, Sr. (1998) uses sensors to detect whether a user is using the left or the right hand. U.S. Pat. No. 5,555,894 to Doyama et al. (1996) uses pressure sensors to detect the curling or stretching of the user's fingers. Other applications use sensors to generate signals for additional functions, such as U.S. Pat. No. 6,456,275 to Hinckley et al. (2002), U.S. Pat. No. 6,396,477 to Hinkley et al. (2002), U.S. Pat. No. 6,288,707 to Philipp (2001). However, none of those involves a replacement of the primary (mechanical) switch controls.

A few U.S. patents and patent applications have suggested the use of sensors to replace primary switch controls. U.S. Pat. No. 5,805,144 to Scholder et al. (1998) uses a touch pad with virtual keys on top of a mouse. U.S. patent application Ser. No. 09/273,455 of Nakamura et al. (2002) discloses similar design. U.S. patent application Ser. No. 09/774,843 of Lewis (2001) proposes a particular sensor switch control to replace the primary mouse switches. In this design, each sensor switch control, when depressed, produces distinct acoustic (with a certain tone) or infrared (with a certain length) signals that are detected by a microphone or a photodetector built in the circuit board. The circuit board is capable of identifying each distinct signal and generates a corresponding digital signal to the computer. However, this design in particular suffers from a number of disadvantages. Although the method and design of such sensor switch controls and circuit board are not disclosed, one can safely assume that they involve a rather complex system, based on their described function. One would have to design a complete system, where each sensor switch control would produce a distinct signal, and the circuitry should be able to identify each signal and generate a corresponding (distinct) electric signal, rather than having individual switch controls that can work independently. The complexity of such system would clearly increases dramatically as the number of switches increases. No consideration is given for a common usage of a mouse switch: press and hold. Such sensor switch control system would also be subject to interference of acoustic and infrared noises from other sources.

Sensors are suitable in detecting a status, for example, the presence of a user's hand, as used in some of the aforementioned prior-art designs. However, the prior-art designs that use sensors as switch controls, and especially as primary switch controls, suffer from serious problems.

In addition to the aforementioned disadvantages and shortcomings of the individual prior-art designs that use sensor as switch controls, there are several common and significant problems that practically prohibit the use of sensors as switch controls for pointing and control devices, especially as primary switch controls.

Figure 1:
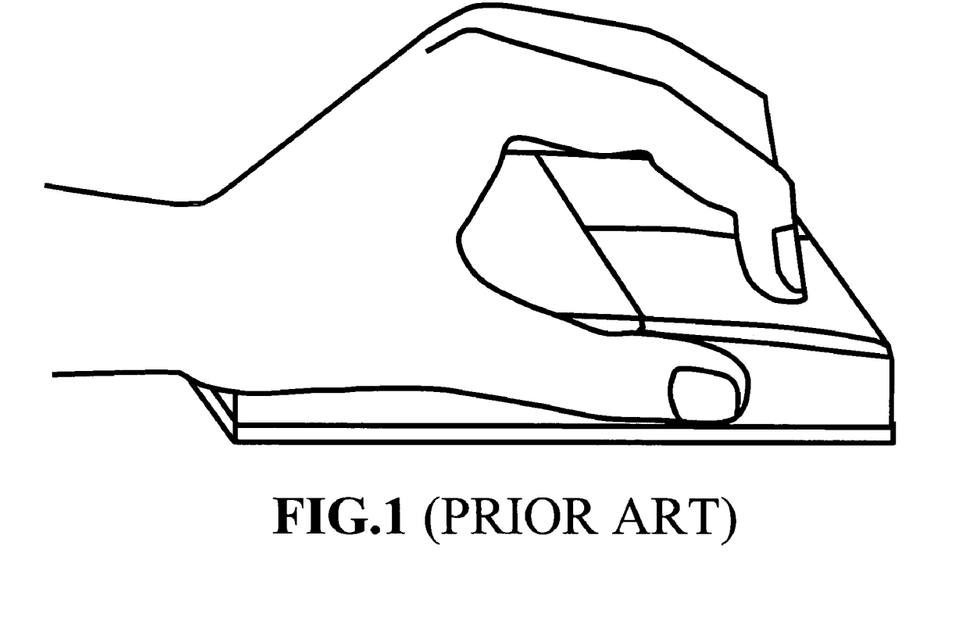
FIG. 1 shows the hand posture while using a typical pointing and control device of the prior art.

First of all, using sensor switch control (or any switch control with a low activation threshold) could in fact aggravate the condition believed to be the major contributor to CTS, namely, an unhealthy hand posture. FIG. 1-A illustrates the hand posture of using a typical prior-art computer mouse. In order to be ready to depress the switch controls, a user often keeps the index and middle fingers on top of the left and right switch control, respectively. However, the user cannot completely let the fingers rest on top of the switch controls since that may activate the switch controls inadvertently, especially for switch controls with low activation threshold. Instead, the user has to make some effort to suspend the fingers on top of the switch controls, which requires the relevant muscle groups to keep up the fingers and the front end of the palm. So the fingers are stressed and the wriest is unnaturally bent. This is certainly an uncomfortable and stressed posture. Although that effort may be relatively minor on a normal scale, the accumulated effect can be significant, especially for people who use pointing and control devices for prolonged periods every day.

If one further reduces the activation threshold of the mechanical switch controls, or replace them with sensor switch controls, the user has to further increase the effort to hold up the fingers, even to the point of completely hold them up in air, without any support whatsoever. Alternatively, a user could rest his/her fingers somewhere else, but then the user would have to move the fingers back into position when the switch activation is needed, which requires even more repetitive efforts and wastes time. Conversely, a higher activation threshold may help to reduce the second problem, but it would make the first problem even more severe.

In practice, a moderate threshold is chosen as a compromise. This reveals another problem of the mechanical switch controls: the activation threshold is more suitable to adults than children. However, as the use of computers (in web surfing, gaming, etc., all of which require particularly intensive switch clicking) becomes more and more popular among children, CTS and RSI will become even more severe problem for children. None of the prior-art designs that propose sensor switch controls addresses or provides any satisfactory solution to these problems.

Therefore, in order for these prior-art designs with sensor switch controls to be practically usable, the activation threshold of the sensor switch controls must be set at the same level as that of the mechanical switch controls. But then, the major advantage of the sensor switch controls, i.e., the low activation threshold, is essentially lost. That leaves sensor switch controls with only their various disadvantages compared to mechanical switch controls.

Mechanical switch control is presently the most popular choice for pointing and control devices. The main reason that accounts for its popularity is that the micro switch naturally produces an audible feedback, i.e., a clicking sound, which provides to the user an effective confirmation of a successful switching. Without such feedback, a user has to wait until some noticeable change may show up on the display. Sometimes, such visual confirmation can be delayed for a few seconds or even longer (for example, in opening a web page). Computer users have got so used to this audible feedback that it becomes an indispensable part of the users' experience.

An audible feedback does not arise naturally with sensor controls, e.g., in a touch pad. This is considered to be a major disadvantage for touch pads. U.S. Pat. No. 5,767,457 to Gerpheide et al. (1998) discloses a system to produce simulated sounds for touch pads. Such system involves microphone, soundcard, and speakers hence is very complicated and costly, although it is capable of generating various types of sounds. U.S. patent application Ser. No. 10/025,838 of Kehlstadt et al. (2002) discloses a solid-state roller (sensor roller) where a micro-controller controlled speaker system is used to produce simulated sound. Again such system is very complicated and expensive. Lacking a feedback accompanying activation and deactivation is also a major hurdle for any attempt to use sensor switch controls in place of mechanical switch controls. Such a feedback actually is more important and even vital for sensor switch controls: with a mechanical switch, a user at least feels that the button cap has been depressed. None of the prior-art designs that propose sensor switch controls addresses or provide effective solution to this problem.

Furthermore, mechanical switch controls are simple, reliable, and easy to make at low cost. They have only two connections to the circuitry. Most of the aforementioned prior-art designs are far more complicated, require significant modifications or even a complete redesign of the electronic system (circuitry), which requires additional effort and cost to develop. These economic factors definitely make such prior-art designs less competitive against the currently existing pointing and control devices that they propose to replace.

In conclusion, in order for a sensor switch control to successfully replace mechanical switch control, three major problems must be solved: (1) lack of feedback upon activation and deactivation; (2) high chance of inadvertent activation; (3) complex structure and significant impact on other components.

BACKGROUND OF INVENTION—OBJECTS AND ADVANTAGES

The present invention overcomes all of the aforementioned problems of prior-art designs and has several additional advantages. The major objectives and advantages of the present invention are:
1. to provide sensor controls that requires zero or significantly low force to activate, hence, reduce the repetitive stress to user's hand;
2. to provide sensor controls with built-in simple feedback-generating means that produce a feedback indicative of operation of the sensor controls;
3. to provide sensor controls that connect to the circuitry in the same way as the original controls, without any modification on the circuitry or other electric components;
4. to provide sensor controls that are simple in structure, durable, and inexpensive to produce;
5. to provide a pointing and control device using such sensor controls, which allows the user's hand and fingers to rest in the most comfortable and relaxed posture, without making any effort such as partially holding fingers up, or move them back and forth, and with much less effort to operate the sensor controls, thus improving the hand posture and reducing stress.

Other advantages will become apparent from the following descriptions and drawings.

SUMMARY

In accordance with a first aspect of the present invention, sensor controls comprise sensors and built-in simple feedback-generating means. The sensor controls of the present invention have simple structure and connect to the circuitry the same ways as the original controls they replace. The sensor controls of the present invention produce various types of feedback to the user indicative of the operation of the sensor controls. In accordance with a second aspect of the present invention, a pointing and control device uses such sensor controls and has an ergonomic design. The pointing and control device of the present invention allows a user to rest his or her hand and fingers in the most relaxed and comfortable posture, without the risk of inadvertent activation of the sensor controls. The present invention overcomes aforementioned problems and shortcomings of the prior-art designs (with mechanical and sensor switch controls) and significantly improves hand posture and reduces stress.

DRAWINGS—FIGURES

In the drawings, closely related figures have the same number but different alphabetic suffixes.

FIG. 4-A shows the working concept of one exemplary sensor switch control using an optical sensor.

FIG. 4-B shows the working concept of another exemplary sensor switch control using an optical sensor.

FIG. 5-A shows a four-direction-magnitude control.

FIG. 5-B shows a loop motion control.

DETAILED DESCRIPTION—Preferred Embodiment

In the preferred embodiment, optical sensors and a computer mouse with two switch controls will be used as examples to illustrate the fundamental idea of the present invention.

Figure 3:
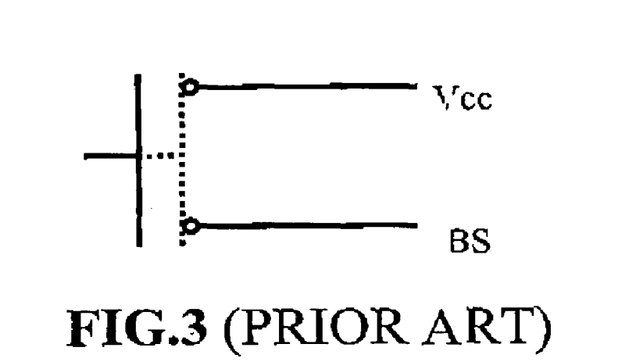
FIG. 3 shows the working concept of a micro switch commonly used with a mechanical control switch.

In order to understand the working principle of the sensor switch control of the present invention, first refer to FIG. 3 for the working principle of a micro switch in a conventional mechanical switch control. One terminal (input) of the micro switch connects to a voltage $V_{cc}$, representing a logic high, and the other terminal (output) connects to a proper input BS in the circuitry. When the micro switch is depressed (illustrated by doted lines), the two terminals are connected, hence, the BS terminal carries a logic high.

Figure 4:
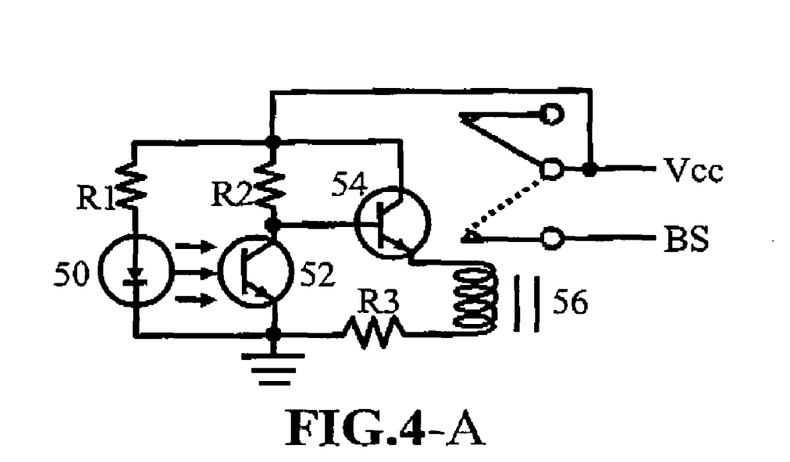

Now refer to FIG. 4-A for the detailed description of an exemplary optical sensor switch control of the present invention. The major parts of this exemplary optical switch are: a LED 50, a phototransistor 52, a transistor 54, and a miniature mechanical relay 56. The LED 50 functions as a light source (either visible or invisible, such as infrared) for the phototransistor 52. When it receives light, the phototransistor 52 is in a conducting state. Hence, the base of transistor 54 is at a low voltage and transistor 54 is in a non-conducting state. Therefore, no current flows through the coil of the mechanical relay 56, and its switch is in an off state. When the phototransistor 52 is blocked (by the user's fingertip or other objects), it changes to the non-conducting state. Hence the base of transistor 54 is at a high voltage and the transistor 54 changes to the conducting state. Now, current flows through transistor 54 and the coil of the mechanical relay, hence, the mechanical relay switches to the on state, connecting terminal BS with terminal $V_{cc}$. The resistors $R_1$, $R_2$, and $R_3$ are used to regulate voltages and currents in the circuit. The phototransistor 52 is masked in all other directions, leaving only a small opening towards the LED 50. This configuration makes the sensor switch control "accurate". In other words, in order to activate the sensor switch control, one has only to block the small opening. A phototransistor with a large light-receiving area is more difficult to screen and it is subject to interference of ambient light.

The mechanical relay is a crucial component for this sensor switch control. It is used not only for its normal functioning (as a relay), but also for a second and even more important reason, namely, as a sound-generating means for this sensor switch control. Mechanical relays naturally produce the same sound as micro switches when they switch state. An important aspect of the present invention is recognizing this remarkable "side" effect of mechanical relays. Mechanical relays are also common and mature commercial products. They are simple in structure, reliable, and inexpensive. Clearly, using a mechanical relay as a sound-generating means is of great advantage over complicated sound-generating means proposed in prior-art designs.

FIG. 4-B shows a variation of the optical sensor switch control, where the mechanical relay is used solely as a sound-generating means. Although in this design the voltage of BS may be slightly lower than $V_{cc}$, due to a small voltage drop across the transistor 54, it is adequate for a logic high. Such design is perhaps more suitable for multiple sensor switch controls sharing a mechanical relay (as a common sound-generating means). In such case, additional resistors of proper resistance values may be needed for each switch control to regulate the current flowing through the relay, since each of the switch controls may deal with a different voltage.

An important characteristic of the sensor switch controls described above is that both the sensor and the sound-generating means use the same constant voltage as input and the sound-generating means is triggered directly by the sensor. In other words, the sound-generating means is "built-into" the sensor switch control. This characteristic is opposite to that of the relevant prior-art designs, where the sound-generating systems spread through the main circuitry of the pointing and control device, and even into the computer (i.e., the device driver, soundcard, and speakers). This characteristic brings significant advantages over those prior-art designs. The sensor switch control of the present invention has a much simpler structure and uses only a few common and inexpensive electronic components. More importantly, the sensor switch control (including the sound-generating means) of the present invention connects to the electronic circuitry exactly in the same way as a micro switch does. This can be easily seen by comparing FIG. 3 with FIG. 4-A and FIG. 4-B. Therefore, no modification to any other electronic component, circuitry, or software is required. These engineering advantages clearly translate into economical advantages as well.

Figure 2:
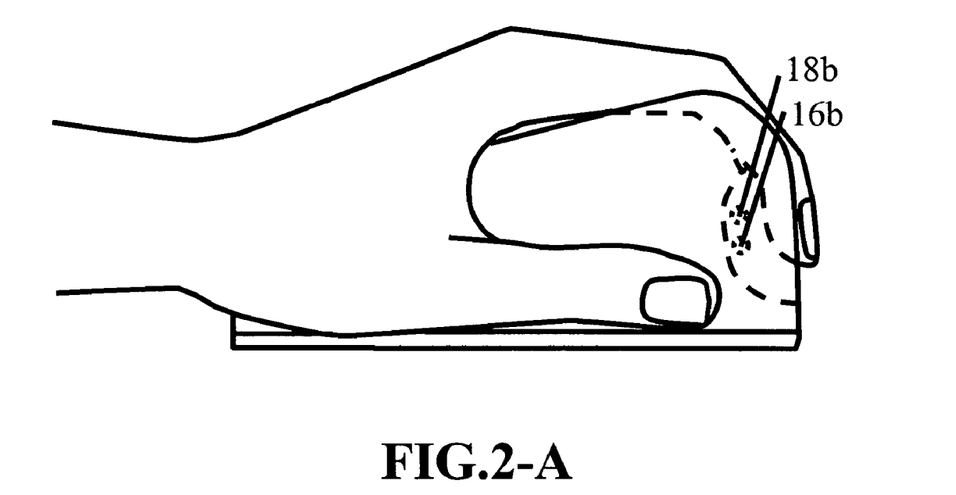
FIG. 2 shows the hand posture while using the pointing and control device of the present invention.

Now refer to FIG. 2-A to 2-C for the second aspect of the present invention: a pointing and control device that uses such sensor switch controls. A computer mouse with two switch controls is used as example. FIG. 2-A shows the side view of the computer mouse and user's hand posture. FIG. 2-B and FIG. 2-C show, respectively, the front and top view of the computer mouse. The top of the mouse has an ergonomically curved surface that fits the user's hand comfortably and supports the entire palm. There are three ridges (12a, 12b, and 12c) with two guiding grooves (14a and 14b) in between. The ridges and guiding grooves extend to the front side of the mouse, and are used to support and guide the index and middle finger of the user (for the exemplary two-switch mouse). Now refer to FIG. 2A. A user rests his or her hand on top of the mouse with index and middle finger in the two guiding grooves. The two guiding grooves support the upper portions of the two fingers and let the fingertips relax naturally in the front side of the pointing and control device, substantially in a vertical position. The lower portion of the guiding grooves facing the fingertips further curves inward to form two recesses.

Two sensor switch controls reside in each recess (FIG. 2-A only shows guiding groove 14b and the corresponding sensor switch controls 16b and 18b, refer to FIG. 2-B and FIG. 2-C for guiding grove 14a and its corresponding sensor controls 16a and 18a). Each sensor switch control comprises a light source and a photodetector, disposed on the opposite sides of the guiding groove. The reason for using two sensor switch controls in each guiding groove will be discussed later. For the time being, simply assume that there is only one sensor switch control in each guiding groove.

The curvature of the guiding grooves and the locations of the sensor switch controls are chosen such that, in the most relaxed and comfortable positions, the fingertips are at a safe distance away from the corresponding sensor switch controls. This configuration allows the user's hand and fingers to rest comfortably, while avoiding inadvertent activation of the sensor switch controls. Hence the posture of user's hand is significantly improved over that in use of the prior-art pointing and control devices (compare FIG. 2-A with FIG. 1). A user no longer has to make effort to suspend the fingers and palm and oddly bend the wriest. This results in a significant reduction of the stress on the relevant muscle groups.

The ser simply curls the corresponding finger to activate a sensor switch control. This requires much less effort than that to depress a mechanical switch. Furthermore, the absolute effort required to activate the sensor switch control for users with smaller hands (such as children) is presumably even less than that for users with larger hands. This is yet another advantage of this invention over prior-art switch controls, which require the same strength for all users, since the activation threshold is fixed.

The ridge-groove structure is somewhat similar to that of a Chinese paintbrush holder or a chopstick holder. In addition to supporting the upper portions of fingers, the guiding grooves play two vital roles. Firstly, in order to solve the problems of the prior-art designs (incorrect hand posture and inadvertent activation), the present invention relocates the (sensor) switch controls to the front side. So, they are now out of the eyesight of the user. The ridge-groove structure helps to keep the fingers in the right places, and guides the fingertips to the sensor switch controls when activation is needed. This is of particular importance for sensor switch controls with relatively confined activation zone. Secondly, the guiding grooves protect the sensor switch controls against inadvertent activation. A sensor switch control can only be activated in a specific activation zone inside the guiding groove, this eliminates the chance of activating the sensor switch control by other fingers or other part of the hand.

It is worth mentioning at this point that several prior-art designs also propose to move the mechanical switch controls to the front side of the mouse. However, without the benefit of low activation threshold of sensor switch controls, such designs actually require even more effort to activate the switch, since curl-pressing is more difficult for human's fingers than down-pressing.

In summary, the present invention provides a systematic solution with several mutually linked components. In order to solve the high activation threshold problem of the mechanical switch controls, sensor controls are used because of their low activation threshold. But the sensor switch controls have an intrinsic problem, namely, inadvertent activation problem, due to their low activation threshold. In order to solve the inadvertent activation problem, the sensor switch controls are relocated to the front side of the mouse, which simultaneously solves the unhealthy hand posture problem. Finally, because the sensor switch controls are out of user's eyesight, guiding grooves are employed to guide the user's fingers and provide further protection against inadvertent activation. The built-in sound-generating means further compensate the lack of feedback of sensor switch controls. The result is an ergonomic pointing and control that provides the optimal hand posture, where the sensor switch controls require minimum effort to operate and provide the same audible feedback as that of conventional mechanical switch controls.

As shown in FIG. 2-A to 2-C, there are actually two sensor switch controls located in each guiding groove. The two sensor switch controls in the same guiding groove are connected in parallel and share one sound-generating means. Therefore, they work together as one (composite) switch control: when any one of the two phototransistors is blocked, or both of them are blocked simultaneously, an on signal and an audible feedback are produced; when the last one is uncovered, or both of them are uncovered simultaneously, an off signal and another audible feedback are produced. This arrangement effectively "enlarges" the activation zone of the sensor switch control to suit both large and small hands. However, if the two sensors are substantially on the pathway of a fingertip in a curling-extension sequence, and the distance between them is relatively large, then, the two sensor switch controls may be activated and deactivated sequentially. So the two sensor switch controls should be positioned as to avoid such double activation. It is obvious that more than two sensor switch controls can be used for such purpose, and it is possible to design an activation zone with a precise shape and size.

Another benefit of using sensor switch controls is that, unlike mechanical switch controls, they do not require gaps around them. So, if the other controls (motion control) can be sealed inside the housing, the use of sensor switch controls allows the housing to be completely sealed. A sealed pointing and control device can be used in unfavorable environmental conditions, such as high dust, humidity, and pressure, or even underwater. This significantly increases the application range of pointing and control devices. Presently, a rubber-bobble covered mechanical switch is commonly used for such applications. But that structure would still be unsuitable to sustain elevated pressures, such as in deep water. On the other hand, sensor switch controls, having no moving parts, can easily be sealed to sustain relatively high pressure.

DETAILED DESCRIPTION—Alternative Embodiments

In the preferred embodiment, dark activated optical sensor switch controls are used. In other cases, light activated optical sensor switch controls may be more appropriate. The sensor switch control circuits described are also exemplary. It should be appreciated by the skilled in the art that many equivalent designs are possible. In the preferred embodiment, the optical sensors have a built-in light source. But it is also possible to use ambient light as the light source. Furthermore, in the preferred embodiment, the optical sensor switch control is activated by interrupting the light flux to the sensor. It is possible to use reflection mechanisms, rather than interruption of light flux, whereby a (light activated) optical sensor switch control is activated by the light reflected from a finger or other objects. In this case, the phototransistor receives light when and only when the user curls the corresponding finger from the relaxed (non-activation) position into activation position, for example. This can readily be achieved by a proper geometry design for the light source and phototransistor.

In the preferred embodiment, mechanical relays are used (primarily) as a sound-generating means. First of all, as mentioned, a major advantage of using a mechanical relay is that it naturally produces a sound that is essentially identical to that produced by a micro switch (used in mechanical switch controls). Secondly, it produces such sound with both activation and deactivation, just like a micro switch. Thirdly, it has such a simple structure that it can be built-into the sensor switch control. Finally, a miniature mechanical relay is a common and inexpensive product. So, it is clearly the preferred sound-generating means for a sensor switch control that is intended to replace the conventional mechanical switch. It should be appreciated by the skilled in the art that many other sound-generating means might also be used. For example, a simple-circuit-driven piezoelectric disc, or any other off-the-shelf sound generator (such as a buzzer or a tone beeper), would work just as well. Although the sounds of these sound-generating devices may differ substantially from that of mechanical switch controls, they may offer further advantages: namely, different sounds can be generated to distinguish different individual switch controls, if needed. These alternative sound-generating means can be used directly in place of the mechanical relays, for example, in FIG. 4-B. Or, they can be used in conjunction with non-mechanical relays (those who do not produce any sound). For example, replacing the mechanical relay in FIG. 4-A with a non-mechanical relay, and connecting a direct-current buzzer (perhaps with a resistor) between terminal BS and ground.

In fact, the feedback is not limited to audible form but can be any other suitable types, for example, visible or tactile. Examples include using LED's and transducers (which convert electric power to vibration), as long as they conform to the fundamental principle of the present invention, in that the feedback devices do not require separate inputs but directly triggered by the signals of the sensor controls. In other words, they are built-into the sensor controls so that sensor controls connect to the circuitry just like conventional controls. From now on, the general term feedback-generating means will be used. Feedback signals may be persistent or have a predetermined duration. It is worth to mention that various types of feedback-generating means have been used in conjunction with pointing and control devices in the prior art. The distinction of the present invention is that (1) the feedback-generating means is built-into the sensor controls, and (2) the feedback-generating means is used solely to indicate the operation of the sensor controls.

In the embodiments described above, the sensor switch controls are simple on-and-off switches. In fact, these on-and-off sensor switch controls can be devised in various other forms, combinations, and arrays to produce whatever more complex and desirable effects. One such example has already been given in the preferred embodiment of pointing and control device, where two such simple sensor switch controls combine to form a sensor switch control with an enlarged activation zone. Two additional such examples will be provided in the following. Sensor control will be used as a general term to refer all of these sensor-based controls, including the simple on-and-off sensor switch control.

Figure 5:
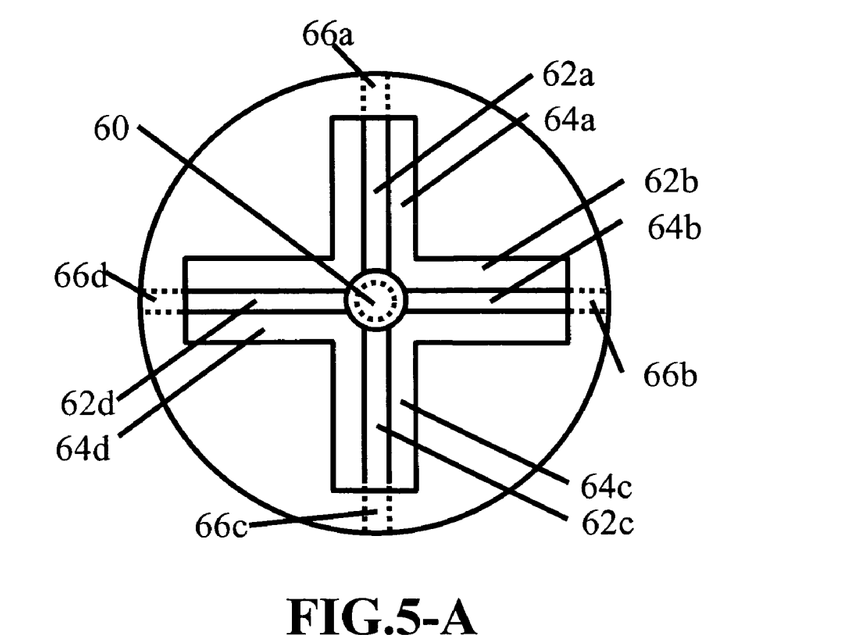

Illustrated in FIG. 5-A is a four-direction-magnitude control, which provides an illustrative example of a multi-direction-magnitude control. This sensor control has a common light source 60 located at the center. There are four arrays of photodetectors, 66*a*, 66*b*, 66*c*, and 66*d*, located symmetrically around the common light source 60. The photodetectors of each array are aligned vertically and are connected in parallel with common output connected to a resistor. The common light source and the photoreceptors are all embedded underneath the surface. There are four groups of small orifices, 62*a*, 62*b*, 62*c*, and 62*d*, reaching from the common light source 60 outward and toward each photodetector, thus forming light guides from the common light source 60 to the photodetectors. Each photodetector is masked in all other directions and exposed only to the corresponding light guide. On top of each groups of light guides, a guiding groove is formed (64*a*, 64*b*, 64*c*, and 64*d*). The guiding grooves begin near the photodetectors and become gradually deeper towards the center, exposing the light guides along its bottom. At their ends near the common light source 60, the guiding grooves are as deep as (or slightly deeper than) the lowest light guides. An object (such as a finger) in a guiding groove blocks all outside light guides. Therefore the current (which can be converted into voltage) flowing through the resistor, which is proportional to the number of photodetectors that receive light, can be varied by changing the position of the object in the guiding groove. So this sensor control is capable of generating signals that indicate four directions with multiple levels of magnitude. Such signals can be used to move a cursor or to scroll an image. A feedback-generating means is shared by all photodetectors so it generates feedback signals when the sensor control is in operation. Or, each array of photodetectors has one feedback-generating means that generates a distinct feedback indicative of direction.

This four-direction-magnitude control provides comparable functionality of prior-art joystick-like controls, but has a number of advantages. First of all, the prior-art joystick-like controls have complicated mechanical and electronic structures, involve many moving mechanical parts and strain gages (or other force detection means). The four-direction-magnitude control of the present invention has a simple structure, involves no moving mechanical parts, hence, it is more reliable and inexpensive. Secondly, it is also easier to operate. It requires no activation force and can be easily controlled with just one finger. Evidently, it is much easier to keep a finger in a precise position than to hold a joystick) lever at a precise orientation, against a returning force of a joystick-like control. Finally, it has a built-in feedback-generating means that provides feedback to the user. A multi-direction-magnitude control can be readily derived from this four-direction-magnitude control, where the number of directions equals the number of photodetector arrays/guiding grooves and the number of magnitude levels equals the number of photodetectors in each array. Obviously, multiple light sources or different configuration can be used. For example, each photodetector may have its own light source. These photodetector/light source pairs are disposed across multiple guiding grooves of equal depth.

Illustrated in FIG. 5-B is a loop motion control using a circular array of optical sensor switch controls sharing one common light source and one feedback-generating means. The common light source 70 is located at the center, and an array of photodetectors 76 is distributed evenly along a circle surrounding the common light source 70. The common light source and the photodetectors are embedded underneath the surface. Also underneath the surface, there is a light guide (not shown in FIG. 5-B) from the common light source to each photodetector. A circular guiding groove 72 is formed in between, cutting through the light guides. A user may operate this loop-motion control by sliding a finger along the guiding groove 72 in a certain direction (clockwise or counterclockwise). Based on the time sequence of the photodetectors being blocked by the finger, this device is capable of generating bi-directional motion signals that can be used for various purposes, such as image scroll. A feedback-generating means is built-into this motion control and generates feedback when the control is in operation. Again, multiple light sources or different configurations can be used.

This loop motion control of the present invention is quite advantageous compared to prior-art designs involving linear optical sensor arrays (such as U.S. Pat. No. 6,496,180 and U.S. Pat. No. 5,095,302 discussed in the background section). The operation ranges of those linear sensor arrays are bounded by the lengths of the linear arrays, whereas the loop motion control of the present invention is boundless, which is similar to a conventional roller-wheel control in this respect. However, the loop motion control of the present invention is much easier to use than a conventional roller-wheel control. A user can only turn a conventional roller-wheel control intermittently, because after each turn the user has to lift and reposition the finger for the next turn. With the motion control of the present invention, a user can move a finger continuously without ever lifting it up or repositioning it. Furthermore, there is no resistance to the finger, except friction. It is obvious that any other closed loop of suitable shape can be used. The multi-direction-magnitude control, as well as the loop motion control, can be placed on an exterior surface of a pointing and control device, and the user can place his or her hand over those controls without worrying about inadvertent activation.

In the last two exemplary sensor controls, the guiding grooves not only guide the fingertip but also prevent the sensor control from inadvertent activation. These sensor controls can be installed on the top of the pointing and control device and a user can place his or her hand over them. These examples of composite sensor controls not only disclose practically useful control designs, but also demonstrate a general method or principle, namely, that of using the on-and-off sensor switch controls of the present invention as building blocks for constructing more sophisticated and exotic sensor controls.

In all the exemplary embodiments disclosed above, optical sensors are used. It should also be appreciated by the skilled in the art that many other types of sensors could be used as well, such as capacitive sensors or other pressure and touch sensors. When using capacitive sensors, they should be properly masked, and the sensitivity of the capacitive sensors should be adjusted to such level that they are activated only when a finger is in contact or in very close proximity, to reduce the chance of inadvertent activation.

The sensor switch control can be packaged as a unit with a small case and two electrical leads, so that they resemble the conventional micro switch (in the sense of electrical connection) and can be used flexibly and individually. The other sensor controls can be packaged similarly. Alternatively, all sensor controls for a particular pointing and control device can be customarily designed together. The combined design allows some parts to be shared, such as light source and feedback-generating means, thus reducing the total number of parts. If a distinct feedback is not needed for each sensor switch control, all of them can share the same feedback-generating means. The light source can also be shared. For example, in the preferred embodiment illustrated in FIGS. 2-A to 2-C, one sound-generating means and one LED (with properly arranged light guides) are sufficient. If a combined design is chosen, a secondary circuit board may be used to host all necessary components for all sensor switch controls (including the feedback-generating means), with their outputs being connected to the primary (original) circuit board.

In the preferred embodiment, a conventional computer mouse with two switch controls is used for the sake of simplicity. It is clear that the principle of the present invention can be applied to pointing and control devices with any number of switch controls. For example, guiding grooves with sensor switch controls may be added for the thumb, ring finger, and even the little finger. In fact, because of their low activation threshold, the sensor switch controls can be comfortably operated by the ring finger as well as the little finger. Furthermore, multiple separate sensor switch controls may exist in one guiding groove and operated by the same finger (at least for index finger). For example, one sensor switch control is activated by curling the finger inwardly and against the left wall of the guiding groove and another one is activated by curling the finger inwardly and against the right wall of the guiding groove. All these can greatly improve the flexibility and controllability of pointing and control devices.

It is also clear that the principle of the present invention can be used in conjunction with other ergonomic or adjustable housings. In fact, the sensor switches of the present invention are particularly suitable for ergonomic and adjustable housings, since they are small, have no moving parts, and only require two electrical connections to the circuitry (no mechanical coupling is needed). As a general principle, one designs the housing structure to provide the optimal static (non-switch operating) position and posture for user's hand. Then, one arranges the guiding grooves such that they conform the finger positions and support the fingers. Finally, one arranges the sensor controls such that they are located a safe distance away from the relaxed positions of the fingertips yet easy to reach when needed.

Conclusion, Ramification, and Scope

The embodiments provided in the foregoing sections may serve only as examples to illustrate the essence of the present invention. It is clear that the present invention can be applied to various other pointing and control devices. Furthermore, some of the components of the present invention can be applied individually to various systems. For example, the simple feedback-generating means of the present invention can also be used in a touch pad, with the main touch pad as well as the virtual switches. The feedback, as an instant confirmation of a qualified tap or a successful activation of a virtual switch, should greatly improve the usability of a touch pad. Because the feedback-generating means of the present invention is so simple, it is possible to incorporate it with the touch pad system with minimal impact on other components, a definite advantage over the prior-art sound-generating systems.

From the foregoing discussion, it is clear that the present invention solves all the aforementioned problems of the prior-art designs. The sensor switch controls of the present invention require much less effort to activate than mechanical switch controls. The sensor controls of the present invention have simple structures and built-in feedback-generating means. When optical motion controls or other types of motion controls that can be sealed in the housing are used, the pointing and control devices that incorporate the present invention allow the housing to be completely sealed. Such sealed pointing and control devices can be used in extreme environment conditions, such as high-dust, high-humidity, high-pressure conditions, and even underwater.

The sensor controls of the present invention use common and inexpensive components, hence, they should be reliable and inexpensive to produce. The sensor switch controls of the present invention connect to the original circuit in exactly the same way as the original switch controls (such as mechanical switch controls), without requiring any modification on other electronic components, circuitry, or software. The pointing and control device of the present invention allows the user's hand and fingers to rest comfortably on the housing, as opposed to having to awkwardly bend the wrest, and suspend the fingers or constantly move the fingers back and forth to position. The present invention makes sensor controls not only functionally feasible, but also economically viable for pointing and control devices.

There are numerous ways of carrying out the fundamental idea and spirit of the present invention. Given the exemplary embodiments, many additional embodiments, ramifications, and modifications will become obvious. These additional embodiments, ramifications, and modifications are all covered by the scope of the present invention. The scope of the present invention should be determined by the appended claims and their legal equivalents, rather than by the given examples.

I claim:

1. A pointing and control device for a computer comprising:
    (a) a housing with an exterior that has at least one guiding groove of predetermined characteristics,
    (b) at least one sensor control that has a predetermined operation zone located inside said guiding groove, said sensor control generating control signals when being operated by a suitable part of user's hand within said operation zone, said control signals being used to control predetermined functions of said computer,
    (c) at least one feedback-generating means, each said feedback-generating means coupling to at least one said sensor control and generating feedback when said sensor control is being operated,
    (d) a circuitry that couples to said sensor controls said feedback-generating means and has a communication link to said equipment, said circuitry processing said control signals and communicating with said computer via said communication link,
    whereby said sensor control allows the user to control said computer without having to apply stressful force, said guiding groove guides the user to operate said sensor control and prevents inadvertent activation of said sensor control, and the user receives feedback indicating the operation of said sensor control.

2. The pointing and control device of claim 1 wherein said sensor control comprises at least one type of sensors selected from the group consisting of optical sensor, infrared sensor, capacitive sensor, resistive sensor, and touch sensor.

3. The pointing and control device of claim 1 wherein said feedbacks are of the types selected from the group consisting of visual feedback, audible feedback, and tactile feedback.

4. The pointing and control device of claim 1 wherein at least one of said sensor controls generates control signals reflecting the manner that said sensor control is being operated.

5. The pointing and control device of claim 1 wherein at least one of said built-in feedback-generating means generates feedbacks reflecting the manner that said sensor control is being operated.

6. The pointing and control device of claim 1 wherein at least one of said sensor control generates a first-type signal when an object of predetermined characteristics exists in said operation zone and a second-type signal when said operation zone is free of said object.

7. The pointing and control device of claim 1 wherein least one of said sensor control generates control signals that are indicative of direction and magnitude.

8. A painting and control device for an equipment comprising:
   (a) a housing having an exterior that substantially fits to user's hand,
   (b) a predetermined number of guiding grooves on the exterior of said housing, each said guiding groove being far at least one finger and having suitable position and curvature that substantially conform to the natural relaxed position and posture of the corresponding finger,
   (c) a predetermined number of sensor controls for each said guiding groove, each said sensor control having an activation zone, said sensor control generating a first-type signal when an object of predetermined characteristics exists in said activation zone and a second-type signal when said activation zone is free of said object, said first-type signals and said second-type signals being used to control predetermined functions of said equipment,
   (d) a circuitry that couples to said sensor controls and has a communication link to said equipment, said circuitry processing said first-type signals and said second-type signals and communicating with said equipment via said communication link,
   whereby said sensor control allows the user to control said computer without having to apply stressful force, and said guiding groove guides the user to operate said sensor control and prevents inadvertent activation of said sensor control.

9. The pointing and control device of claim 8, at least one feedback-generating means is further added, each said feedback-generating means coupling to at least one said sensor control and generating at least one type of feedbacks selected from the group consisting of visual, audible, and tactile feedback, in response to at least one cause selected from the group consisting of said first-type signal, said second-type signal, the transition from said second-type signal to said first-type signal, and the transition from said first-type signal to said second-type signal, whereby the user receives said feedback when operating said sensor controls.

10. The pointing and control device of claim 8 wherein said sensor control comprises at least one type of sensors selected from the group consisting of optical sensor, infrared sensor, capacitive sensor, resistive sensor, and touch sensor.

11. The pointing and control device of claim 8 wherein at least one of said sensor controls comprises a plurality of parallel-connected sensors, whereby activating any one of said parallel-connected sensors activates said sensor control.

12. A pointing and control device for equipment comprising:
   (a) a housing having an exterior that substantially fits to user's hand,
   (b) a predetermined number of sensor controls, each said sensor control having a predetermined activation zone, said sensor control generating a first-type signal when an object of predetermined characteristics exists in said activation zone and a second-type signal when said activation zone is free of said object said first-type signals and said second-type signals being used to control predetermined functions of said equipment,
   (c) a predetermined number of feedback-generating mean, each said feedback-generating means coupling to at least one said sensor control, said feedback-generating means generating feedbacks in response to at least one cause selected from the group consisting of said first-type signal, said second-type signal, the transition from said second-type signal to said first-type signal, and the transition from said first-type signal to said second-type signal,
   (d) a circuitry that couples to said controls and said feedback generating means and has a communication link to said equipment, said circuitry processing said first-type signals and said second-type signals and communicating with said equipment via said communication link,
   whereby said sensor control allows the user to control said computer without having to apply stressful force, and the user receives feedback indicating the operation of said sensor controls.

13. The pointing and control device of claim 12 wherein a predetermined number of said sensor controls have their activation zones located inside recesses of predetermined characteristics on the exterior of said housing, whereby said recesses prevent inadvertent activation of said sensor controls.

14. The pointing and control device of claim 12, a predetermined number of said sensor controls have their activation zones located inside guiding grooves of predetermined characteristics on the exterior of said housing, whereby said guiding grooves guide the user to operate said sensor controls and prevent inadvertent activation of said sensor controls.

15. The pointing and control device of claim 12 wherein said sensor control comprises at least one type of sensors selected from the group consisting of optical sensor, infrared sensor, capacitive sensor, resistive sensor, and touch sensor.

16. The pointing and control device of claim 12 wherein said feedbacks are of the types selected from the group consisting of visual feedback, audible feedback, and tactile feedback.

17. The pointing and control device of claim 12 wherein said sensor controls are divided into a plurality of groups, each group shares a feedback-generating means that generates a distinct form of feedback, whereby the feedback is indicative of which group of said sensor controls is being operated.

18. The pointing and control device of claim 12 further has other type of controls in addition to said sensor controls.

19. The pointing and control device of claim 12 wherein at least one of said sensor controls comprises a plurality of parallel-connected sensors, whereby activating any one of said parallel-connected sensors activates said sensor control.

20. The pointing and control device of claim 12 wherein one of said first-type signal and said second-type signal is a null signal.

* * * * *